United States Patent

Marks

[11] Patent Number: 6,018,910
[45] Date of Patent: *Feb. 1, 2000

[54] WOODEN KNOCKDOWN FRAME FOR PLANTER BOXES

[76] Inventor: Alan C. Marks, 7 La Rancheria, Carmel Valley, Calif. 93924

[*] Notice: This patent is subject to a terminal disclaimer.

[21] Appl. No.: 08/802,460

[22] Filed: Feb. 20, 1997

Related U.S. Application Data

[60] Provisional application No. 60/011,875, Dec. 19, 1996.

[51] Int. Cl.$^7$ ...................................................... A01G 9/02
[52] U.S. Cl. ............................................................. 47/66.1
[58] Field of Search ..................................... 47/66.1, 65.5

[56] References Cited

U.S. PATENT DOCUMENTS

| | | | |
|---|---|---|---|
| 1,407,664 | 2/1922 | Kuebler et al. | 47/66.1 |
| 1,420,191 | 6/1922 | Hassig | 47/66.1 |
| 3,955,320 | 5/1976 | Serovy et al. | 47/66.1 |
| 4,955,499 | 9/1990 | Petty | 47/66.1 |

FOREIGN PATENT DOCUMENTS

| | | | |
|---|---|---|---|
| 0517117 | 12/1992 | European Pat. Off. | 47/66.1 |
| 2411556 | 8/1979 | France | 47/66.1 |
| 2502456 | 10/1982 | France | 47/66.1 |
| 2530408 | 1/1984 | France | 47/66.1 |
| 2605256 | 8/1976 | Germany | 47/66.1 |

*Primary Examiner*—Michael J. Carone
*Assistant Examiner*—Joanne C. Downs

[57] ABSTRACT

A knockdown planter box frame composed of two basic components in the form of frames and posts which may be easily releasably joined together. The frame is intended to secure non-wooden internal panels which contain solid nutrients such as soil and fertilizer. The wooden framework receives protection from direct contact with decay-causing micro-organisms in the growing medium. Panels are removable in such a way as to facilitate pruning a rootball without removal of the plant.

1 Claim, 2 Drawing Sheets

WOODEN KNOCKDOWN FRAME FOR PLANTER BOXES

CROSS-REFERENCES TO RELATED APPLICATIONS

This application refers to information which is the subject of Provisional Patent Application Ser. No. 60/011,875. It can utilize the fiber-reinforced cement panels which are the subject of regular patent application Ser. No., 08/641,435, filed May 1, 1996, now abandoned.

| | | |
|---|---|---|
| 3,724,127 | 4/1973•Rosenwach; Wallace | 47/66 |
| 3,955,320 | 5/1976•Serovy, Walter et al. | 47/66 |
| 4,041,643 | 8/1977•Sommerville | 47/66 |
| 4,901,473 | 2/1990•Taule | 47/66 |

BACKGROUND OF THE INVENTION

1. Field of Invention

This invention relates to plant receptacles, specifically to an improved construction using wood for planter boxes which employs a knockdown frame to hold panels of materials other than wood.

2. Description of Prior Art

Wooden Planter boxes in the past have been entirely constructed out of wood, and in particular, redwood. Redwood enjoys a false reputation for being impervious to decay in contact with soil and moisture. In reality, all indigenous species of wood rot relatively quickly under these conditions. Consequently, any conventional wooden planter box needs periodic replacement.

Because they inevitably rot, wooden boxes have sometimes been lined with thin metal sheets. These are metals, such as copper or galvanized steel. Metal protects the wood from decay, but such linings are expensive to fabricate.

Wooden planter boxes have shipped in fully assembled form. One assembly method utilizes wooden sides which are held in restrained in position by a tensioned metal strap. Another method utilizes tongue and groove construction to hold wooden planks together. One example of prior art, U.S. Pat. No. 4,9001,473, may be disassembled and assembled in knockdown form and utilizes a frame, post and panel construction. It is constructed preferably of metal and it utilizes an interlocking construction of tongues and hooks. Another, U.S. Pat. No. 1,407,664, discloses an enclosure in which rest either sides comprising either discrete vertical slats or a one-piece earthenware container, both of which allow water to drain through a perforated bottom into a drip pan.

Shipping costs add much to the expense of marketing planter boxes because of the volume they occupy. Most of the volume of an assembled planter box is empty space. It would be a decided advantage to be able to ship knockdown parts as an alternative. U.S. Pat. No. 3,955,320 discloses a wooden planter box which may be shipped in knockdown form.

One way to prevent planter box rot is to construct the boxes of plastic. As an additional advantage, plastic planters may be nested for shipping purposes. However, plastic does not have the aesthetic appeal of wood and plastic production depletes non-renewable oil resources.

Recently, the increased cost of wood in general, and of redwood in particular, makes manufacturing planter boxes very expensive. This, plus its vulnerability to rot and decay and the resultant waste of material raises questions about the continued suitability of redwood for this application. Environmental issues have also been raised surrounding dwindling redwood resources. A major advantage for a planter box would be to enable side panels to be easily removed to enable root pruning entirely without removing the soil. Only one design, which is embodied in planter boxes found in the Orangerie in Versailles, France, permits this. This cumbersome and expensive planter box is referred to as the Caisse de Versailles, and utilizes iron straps and iron fasteners on removable oak side panels.

SUMMARY

A knockdown wooden framework enabling the use of rot-resistant materials as panels for boxes which contain solid nutrients such as soil and fertilizer. The panels themselves form a receptacle in such a way as to protect the wooden framework which encloses or supports them from contact with the solid nutrients contained in the planter box. The framework is thusly protected from decay-causing micro-organisms in the growing media. Removal of the upper horizontal frame permits sliding the panels upward for removal and enables pruning of the rootball without disturbing the roots.

Several objects of my invention are:

a) to enable the use of wood structurally while protecting the wood from contact with soil and the resulting decay;

b) to reduce shipping costs;

c) to increase the structural longevity of a wood planter box many times over that of conventional wood boxes;

f) to produce a durable planter box aesthetically superior to plastic and resin products;

g) To encourage the use of wood, a renewable natural resource, instead of plastic, which is made from non-renewable hydrocarbons.

h) To enable pruning a rootball without necessitating removal of the plant.

Used as described in the preceding paragraphs, my knockdown wooden framework provides a number of advantages:

(a) Forests of native redwood trees, which provide most of the wood used for planter boxes today, have been seriously depleted. Any way of reducing additional usage of this resource is environmentally preferable. A framework of wood is much less wasteful than full sides and bottoms of the material.

(b) The use of panels consisting of materials other than wood posesses decorative advantages. Fiber-reinforced cement sheet, for example, is composed of 90% cement, it can be textured with cement-based products and painted. The exterior can also be used as a substrate for stucco and for application of decorative stucco pattern molds.

(c) Panels are readily replaceable and this enables optional choices or changes of color, material, and/or decoration without any structural changes.

(d) If wood does not contact soil directly, a species of wood costing less than redwood may be employed, further reducing the cost of manufacture.

(e) The entire knockdown frame assembly can be made of multiples of two parts type. This simplifies manufacturing and makes the assembly more economical to produce.

(f) Since the panels and bottom need not fit tightly against one another, the space between them permits drainage from the soil. The expense of providing special drainage means is avoided.

(g) Panels are easily removed without disturbing the rootball to enable pruning the roots without removal of the plant.

BRIEF DESCRIPTION OF THE DRAWINGS

Further objects and advantages of the present invention will become apparent from a consideration of the detailed description of the preferred embodiment of the invention which follows this brief description.

DETAILED DESCRIPTION OF THE PREFERRED EMBODIMENT

Figure 1:
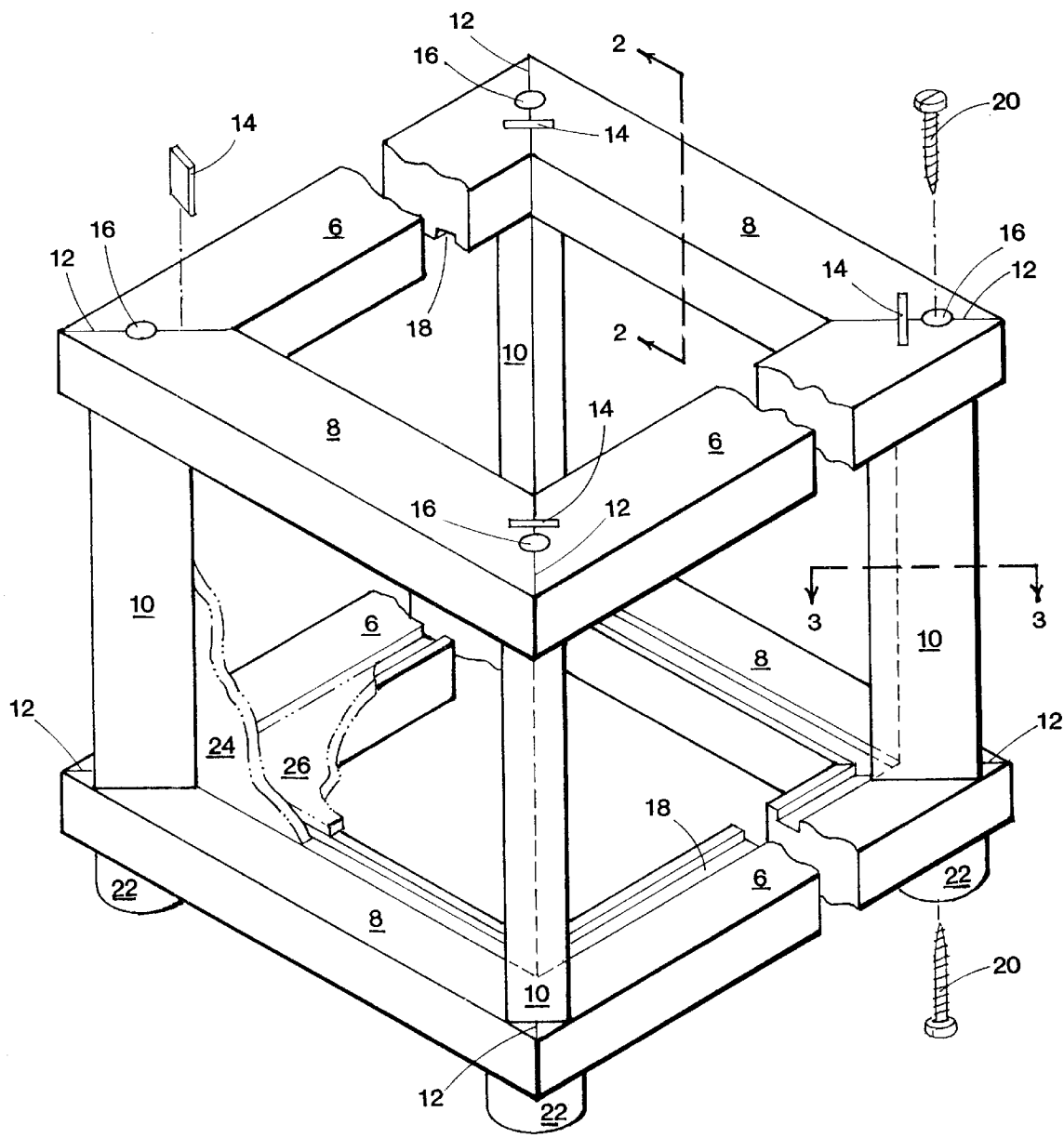
FIG. 1 is a fragmentary perspective view of the framework. Portions of a side panel and a bottom are indicated by phantom lines to show the manner in which a side and a bottom relate to the framework structure. Neither the side nor the bottom are integral parts of the framework.
Figure 2:
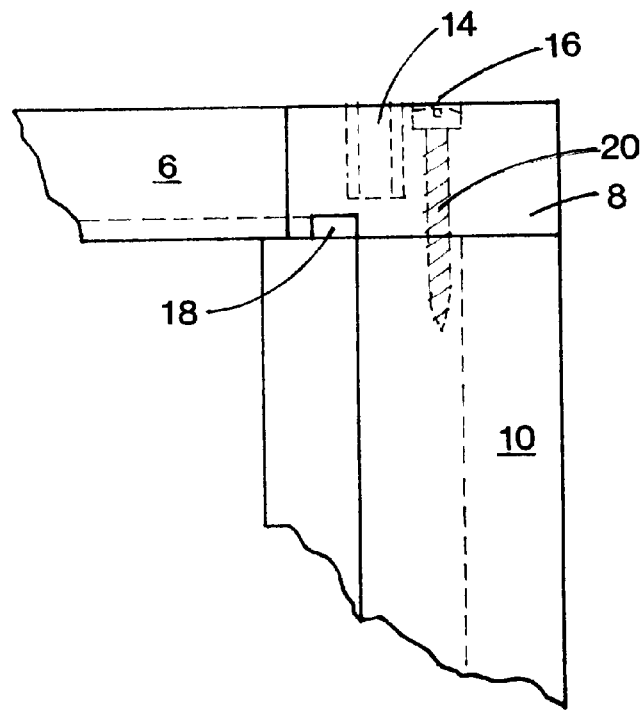
FIG. 2 is a fragmentary sectional view taken along the line 2—2 of FIG. 1.
Figure 3:
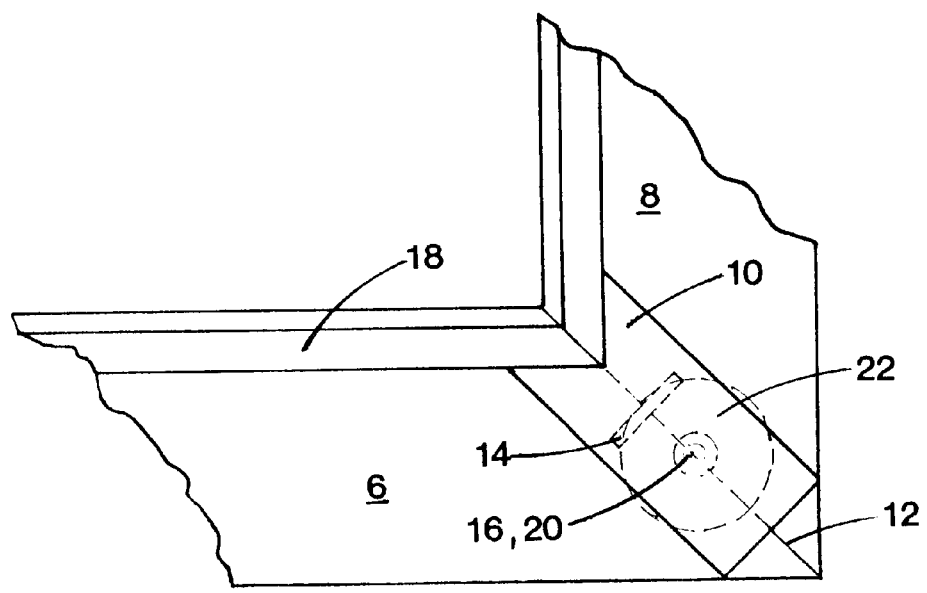
FIG. 3 is a fragmentary sectional view taken along the line 3—3 of FIG. 1.

The preferred embodiment is shown in FIG. 1. The knockdown framework consists of an upper and a lower frame. These are identical, preassembled frames which may be either square or rectangular in shape. These frames are formed by two pairs of opposing parallel members 6 and 8 which are rectangular in cross-section. The members join at each corner in a miter joint 12. The joint is shown secured by means of a staple 14.

Each discrete frame member has a groove, 18, to receive the side panels. A side panel 24 is indicated to indicate placement. The grooves align and form one continuous groove around the frames' inner perimeters.

The upper frame is oriented such that its groove is on its lower surface. The lower frame is oriented such that its groove is on its upper surface.

The assembled frames have clearance holes 16 at each miter joint 12 for eight screws 20 which engage and secure the frames to four identical vertical struts 10. The posts are V-grooved at right angles along their inside vertical edges and are held under compression by the frames. The surfaces of the groove thus formed are aligned along the same planes as the sides of the continuous frame grooves. Together, the frame grooves and the inner vertical surfaces of the grooved posts provide support for the panels against the pressure of soil contained by the planter box. The one-piece panels and bottom may be made of any non-decomposing material.

A bottom 26 is shown to indicate placement. It rests on the portion of the upper interior surface of the bottom frame. This portion is inside the perimeter formed by the continuous groove.

Although not an integral part of the framework, feet 22 are nevertheless shown to indicate how the framework's design makes possible the attachment of feet without any additional fastening means. Feet perform the desirable function of separating the lower frame from contact with the ground. They may be made of a durable nonabsorbant material such as plastic.

Although the above description contains many specificities, these should not be construed as limitations on the scope of the invention, but rather as an exemplification of one preferred embodiment thereof. Other variations are possible. For example, the frame members may be fastened together by means other than as illustrated and other fastening means other than the one illustrated might be employed to secure the frames to the posts. Similarly, the planter box may have as few as three sides or more than four.

Thus the scope of the invention should not be determined by the embodiments illustrated. The scope should be determined by the appended claims and their legal equivalents.

I claim:

1. A knockdown wooden planter box framework comprising:

a. two horizontally planar wooden frames separated in opposing spatial relationship such that said frames occupy upper and lower positions, said frames comprising a plurality of at least three members, each said member being essentially rectangular in cross section, each said member being angularly related to each adjacent member, and each said member being joined and fastened in mitered abutment at each of its ends to each adjacent member by fastening means such that each of said frames forms an independent, releasably fastened unitary structure, said upper frame having a continuous open groove extending along the inside perimeter of its lower surface and said lower frame having a continuous open groove extending along the inside perimeter of its upper surface and b. a plurality of at least three vertical wooden struts, each of said struts having upper and lower end surfaces positioned between and abutting opposing corners of each of said frames, the end surfaces of said struts having fastening means adapted to be releasably fastened to said corners by fastening means and c. a plurality of at least three monolithic vertical side panels of material selected from the group of essentially non-decomposing materials consisting of fiber-reinforced cement, plastic, fiber-reinforced plastic resin, ceramics and clay, the edges of said panels removably engaged in and held by the open continuous grooves of said upper and lower frames and d. a horizontal bottom panel of material selected from the group of essentially non-decomposing materials consisting of fiber-reinforced cement, plastic, fiber-reinforced plastic resin, ceramics and clay, said bottom panel being contained within the boundary defined by said vertical side panels.

* * * * *